(12) United States Patent
Hwang et al.

(10) Patent No.: US 10,845,847 B2
(45) Date of Patent: Nov. 24, 2020

(54) HEAD-MOUNTED DISPLAY

(71) Applicant: LG ELECTRONICS INC., Seoul (KR)

(72) Inventors: Jungyeon Hwang, Seoul (KR);
Youngwon Jeong, Seoul (KR);
Donghyok Shin, Seoul (KR);
Kangheui Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 16/098,796

(22) PCT Filed: May 12, 2016

(86) PCT No.: PCT/KR2016/004994
§ 371 (c)(1),
(2) Date: Nov. 2, 2018

(87) PCT Pub. No.: WO2017/191861
PCT Pub. Date: Nov. 9, 2017

(65) Prior Publication Data
US 2019/0138053 A1 May 9, 2019

(30) Foreign Application Priority Data

May 3, 2016 (KR) .................. 10-2016-0054819

(51) Int. Cl.
*G06F 1/16* (2006.01)
*G02B 27/01* (2006.01)

(52) U.S. Cl.
CPC .......... *G06F 1/1637* (2013.01); *G02B 27/01* (2013.01); *G06F 1/163* (2013.01)

(58) Field of Classification Search
None
See application file for complete search history.

(56) References Cited

U.S. PATENT DOCUMENTS 6,727,865 B1 * 4/2004 Yonezawa ............ G02B 27/017
345/7
8,025,396 B1 9/2011 Power
(Continued)

FOREIGN PATENT DOCUMENTS

JP 2007251890 9/2007
KR 20140025121 3/2014
(Continued)

OTHER PUBLICATIONS

PCT International Application No. PCT/KR2016/004994, International Search Report dated Dec. 19, 2016, 2 pages.
(Continued)

*Primary Examiner* — Stephen T. Reed
(74) *Attorney, Agent, or Firm* — Lee, Hong, Degerman, Kang & Waimey

(57) ABSTRACT

The present invention provides a head-mounted display comprising: a first body and a second body having a first display portion and a second display portion, respectively, each of the first body and the second body being formed to be wearable on a user's head; a third body connecting one end of the first body and one end of the second body with each other; and a fixing module formed on each of the other ends of the first body and the second body, so as to allow the other end of the first body and the other end of the second body to be coupled together or to be separated from each other, wherein the fixing module includes a latch portion having an insert groove, the latch portion protruding from the second body and extending through the other end of the first body, and a pin portion installed on the first body and formed to be insertable into the insertion groove of the latch portion extending through the other end of the first body.

12 Claims, 16 Drawing Sheets

(56) References Cited

U.S. PATENT DOCUMENTS

| | | | |
|---|---|---|---|
| 2013/0050833 A1* | 2/2013 | Lewis | G02B 30/36 |
| | | | 359/630 |
| 2013/0077043 A1 | 3/2013 | Moran | |
| 2014/0152688 A1 | 6/2014 | Sako et al. | |
| 2016/0011425 A1* | 1/2016 | Thurber | G02B 27/64 |
| | | | 345/8 |
| 2018/0003984 A1* | 1/2018 | Lai | A42B 7/00 |

FOREIGN PATENT DOCUMENTS

| | | |
|---|---|---|
| KR | 20140105319 | 9/2014 |
| WO | 2015097959 | 7/2015 |

OTHER PUBLICATIONS

European Patent Office Application Serial No. 169010873, Search Report dated Jan. 21, 2020, 7 pages.

\* cited by examiner (a)　　　　　　　　　　(b)

(a)

(b)

(a)

(b)

HEAD-MOUNTED DISPLAY

CROSS-REFERENCE TO RELATED APPLICATIONS

This application is the National Stage filing under 35 U.S.C. 371 of International Application No. PCT/KR2016/004994, filed on May 12, 2016, which claims the benefit of earlier filing date and right of priority to Korean Application No. 10-2016-0054819, filed on May 3, 2016, the contents of which are all hereby incorporated by reference herein in their entirety.

TECHNICAL FIELD

The present invention relates to a head-mounted display in which display portions are separable.

BACKGROUND ART

Terminals may generally be classified as glass type terminals (mobile (portable) terminals) and stationary terminals according to a moveable state. The glass type terminals may be also classified as handheld terminals and vehicle mount terminals according to a user's carriage method.

As functions of terminals become more diversified, the terminals may support more complicated functions such as capturing images or video, reproducing music or video files, playing games, receiving broadcast signals, and the like. By comprehensively and collectively implementing such functions, the terminals may be embodied in the form of multimedia players or devices. In order to support and increase functions of terminals, improvement of structural parts and/or software parts of terminals may be taken into consideration.

Recently, a wearable-type glass-type terminal which may be worn on a part of a human body has been developed. A glass type terminal worn on a user's head may be a head-mounted display (HMD). A display unit provided in a glass type terminal such as an HMD may be combined with an augmented reality (AR) technology, an N-screen technology, and the like, beyond a simple image output function, to provide various conveniences to users.

However, a head-mounted display worn on a head requires a device for pressing the head to ensure stable wearing. Thus, when the head-mounted display is detached, it is necessary to remove a device stably fixed to the head, which is inconvenient for attachment and detachment.

Further, as the head-mounted displays are commercialized, the user's need for a structure that may be more conveniently mounted (worn on) the head to receive an image is increasing.

DISCLOSURE

Technical Problem

An aspect of the present invention provides a head-mounted display in which display portions are separable so as to be easily worn on or removed from a user's head.

Technical Solution

According to an aspect of the present invention, there is provided a head-mounted display including: first and second bodies respectively having first and second display portions and configured to be wearable on a user's head; a third body connecting one end portions of the first and second bodies; and a fixing module formed at each of the other end portions of the first and second bodies and allowing the other ends of the first and second bodies to be coupled to each other or to be separated from each other, wherein the fixing module includes: a latch portion protruding from the second body and having an insertion hole penetrating through the other end portion of the first body; and a pin portion installed at the first body and inserted into the insertion hole of the latch portion penetrating through the other end portion of the first body.

In an example related to the present invention, the latch portion may include first and second latches disposed to be spaced apart from each other, and the pin portion may include first and second pins in which one end portion thereof is inserted into the insertion hole; a connection bar connecting the first and second pins; and a third pin extending from the connection bar in a direction in which the first and second pins extend and having one end portion protruding to the outside of the first body.

In an example related to the present invention, the head-mounted display may further include: a tightening unit mounted at one region of the first to third bodies and reducing and expanding a space formed by the first to third bodies in a state in which the first and second bodies are coupled, wherein the tightening unit may include a wire fixed to the first and second bodies and a tightening portion connected to the wire and providing a tension to the wire according to rotation. Thus, the user may adjust the space between the first to third bodies according to a size of the user's head.

In an example related to the present invention, the head-mounted display may further include: a moving module mounted at one region of the first and second display portions and the first and second bodies to move the first and second display portions in a direction away from each other or toward each other, wherein the moving module includes a handle portion exposed to the outside of the first and second bodies, a gear portion interworking with rotation of the handle portion, and a rack disposed at the first and second display portions or the first and second bodies and engaged with the gear portion, to thereby adjust a space between the first and second display portions.

In an example related to the present invention, the head-mounted display may further include: a sensor portion sensing a coupled state of the first and second bodies, a separated state of the first and second bodies, and a state of the first and second bodies worn on the user's head; and a controller controlling the first and second display portions on the basis of a state sensed by the sensor portion, to thereby automatically control output of an image on the basis of a worn-on state of the head-mounted display.

Advantageous Effects

According to the present invention, since the first and second bodies respectively having the display portions corresponding to both eyes are separated from each other, the user may separate the bodies from the front of both eyes to detach the head-mounted display from the head.

The first and second bodies may be easily engaged and disengaged by the tightening module disposed between the first and second bodies, and the head may be appropriately pressed using the wire of the tightening module connected to the first and second bodies. Therefore, the user may stably fix the head-mounted display to the head, regardless of size of the head.

Also, since the first and second bodies are driven in different modes based on states thereof, information may be continuously output or limited, without applying an additional control command, reducing power consumption.

BEST MODES

Hereinafter, the embodiments of the present invention will be described with reference to the accompanying drawings, in which like numbers refer to like elements throughout although the embodiments are different, and a description of the like elements a first embodiment will be used for those of the different embodiment. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

As used herein, the singular forms "a", "an" and "the" are intended to include the plural forms as well, unless the context clearly indicates otherwise.

It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

Figure 1A:
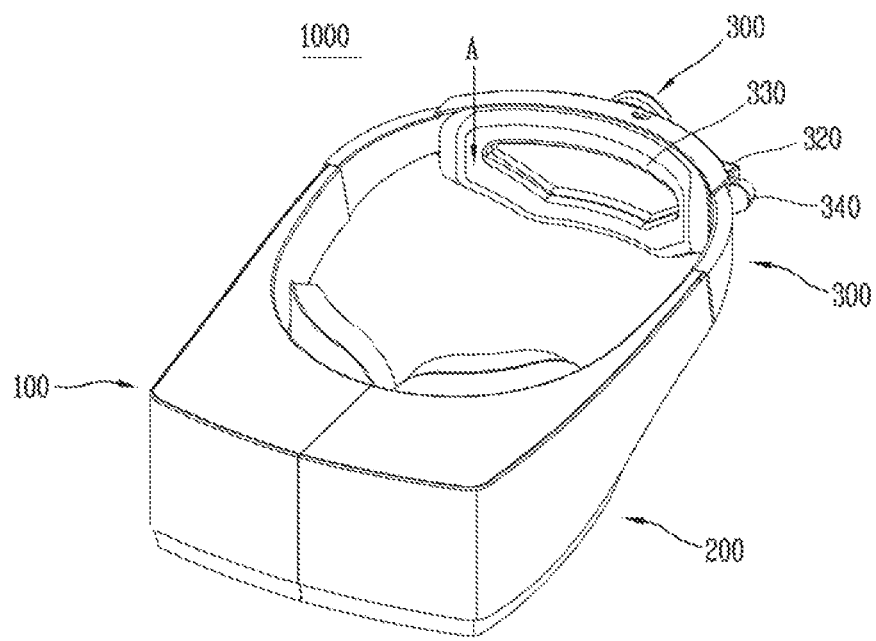
FIG. 1A is a view of a head-mounted display according to an embodiment of the present invention, viewed from one direction.
Figure 1B:
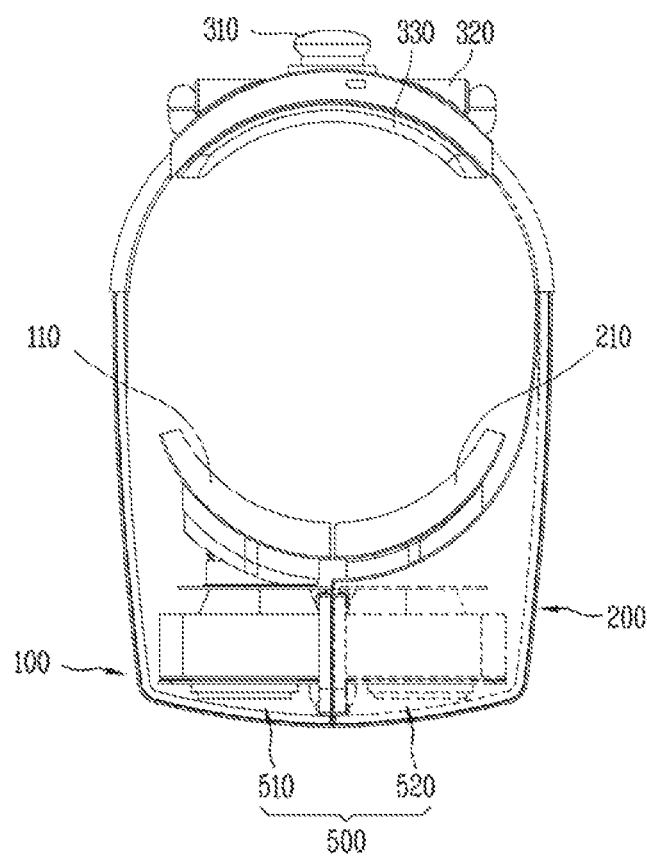
FIG. 1B is a view of the head-mounted display of FIG. 1A, viewed from a direction CA'.

FIG. 1A is a view of a head-mounted display according to an embodiment of the present invention, viewed from one direction, and FIG. 1B is a view of the head-mounted display of FIG. 1A, viewed from a direction CA'.

Referring to FIGS. 1A and 1B, a head-mounted display 1000 may include a first body 100, a second body 200, and a third body 300. The third body 300 connects the first and second bodies 100 and 200.

The first and second bodies 100 and 200 are symmetrically connected to the third body 300, and when the head-mounted display 1000 is worn on the user's head, the third body 300 are in contact with the rear of the user's head and the first and second bodies 100 and 200 are respectively disposed on the user's both eyes. A display unit 500 for outputting images to the first and second bodies 100 and 200 is disposed.

The ends of the first and second bodies 100 and 200, which are not connected to the third body 300, are formed to be in contact with each other. End portions of the first and second bodies 100 and 200 are connected to each other when the head-mounted display 1000 is worn and the first and second bodies 100 and 200 are separated when the head-mounted display 1000 is released from the worn-on state.

First and second display portions 510 and 520 are mounted inside the first and second bodies 100 and 200, respectively. In the worn-on state, the first and second display portions 510 and 520 are disposed to face the user's eyes. Although not illustrated in the drawings, the first and second display portions 510 and 520 may output an image.

First and second support portions 110 and 210 are mounted on the first and second bodies 100 and 200, respectively. The first and second support portions 110 and 210 are respectively disposed on inner circumferential surfaces of the first and second bodies 100 and 200 to support the user's head in a worn-on state. The first and second support parts 110 and 210 form an opening region, and the user may be provided with an image output from the display part 510 through the opening region.

A third support portion 330 is formed on an inner surface of the third body 300 to support the user's head. The presence of the first to third support portions 110, 210, and 330 may minimize pressure and weight that the user may feel when the head-mounted display 1000 is worn on the user's head.

A tightening portion 311 is formed at the third body 300 and a rear unit 320 on which various electronic components and circuits are mounted is disposed. The tightening portion 300 is a unit allowing the first and second bodies 100 and 200 to be moved with respect to the third body 300 in a state in which the first and second bodies 100 and 200 are coupled to each other. When the first and second bodies 100 and 200 are tightened by the tightening portion 300, an internal space formed by the first to third bodies 100, 200, and 300 becomes narrow and the head-mounted display 1000 may be mounted more stably on the user's head. The tightening portion 311 may include a wire connected to the first and second bodies 100 and 200, a spool for connecting the wire, and a dial tightening device for moving the wire.

When the tightening portion 311 is tightened in a state in which the first and second bodies 100 and 200 are coupled, the first and second bodies 100 and 200 may become close to the third body 3100 or a region in which the first and second bodies 100 and 200 overlap the third body 300 is increased. Further, when the wire is loosened by an operation of the tightening portion 311, the space formed by the first to third bodies 100, 200 and 300 is expanded.

Accordingly, the user may wear the head-mounted display 1000 more stably by tightening the first to third bodies 100, 200, and 300.

Meanwhile, the third body 300 is equipped with an audio output module 340 for outputting an auditory signal. The audio output module 340 is in the form of an earphone detachably attached to the user's ear.

FIGS. 2A to 2D are conceptual diagrams for explaining a use state of the head-mounted display in which the first and second bodies are separated.

Figure 2A:
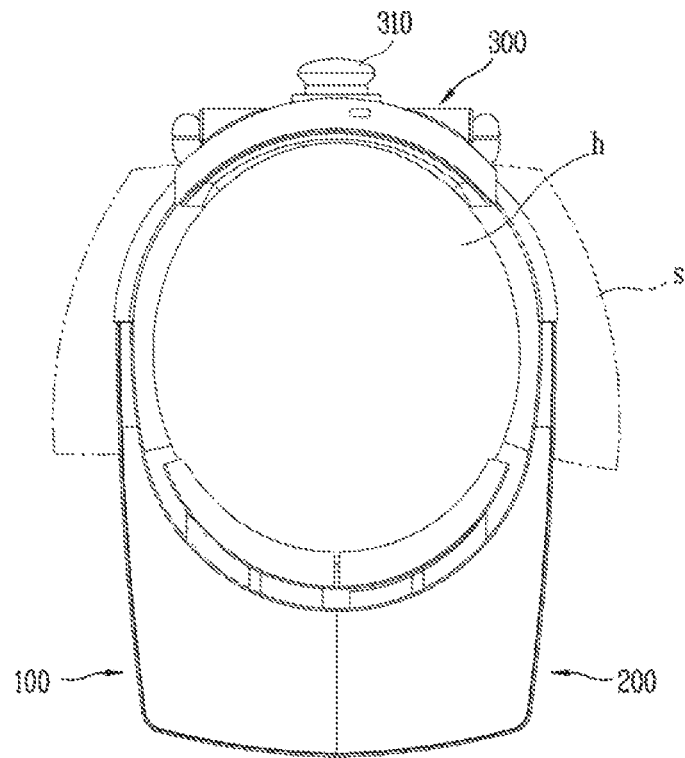
FIGS. 2A to 2D are conceptual views illustrating a use state of a head-mounted display in which first and second bodies are separated.

FIG. 2A illustrates a first state in which the head-mounted display 1000 is worn on the user's head. A head h is inserted into a space formed by the first, second, and third bodies 100, 200, and 300. The user may adjust the space formed by the first to third bodies 100, 200, and 300 to fit a size of the head h using the tightening portion 311 in a state in which the first and second bodies 100 and 200 are connected.

While the first and second bodies 100 and 200 are connected, the controller may control the first and second display portions 510 and 510 to output an image.

Figure 2B:
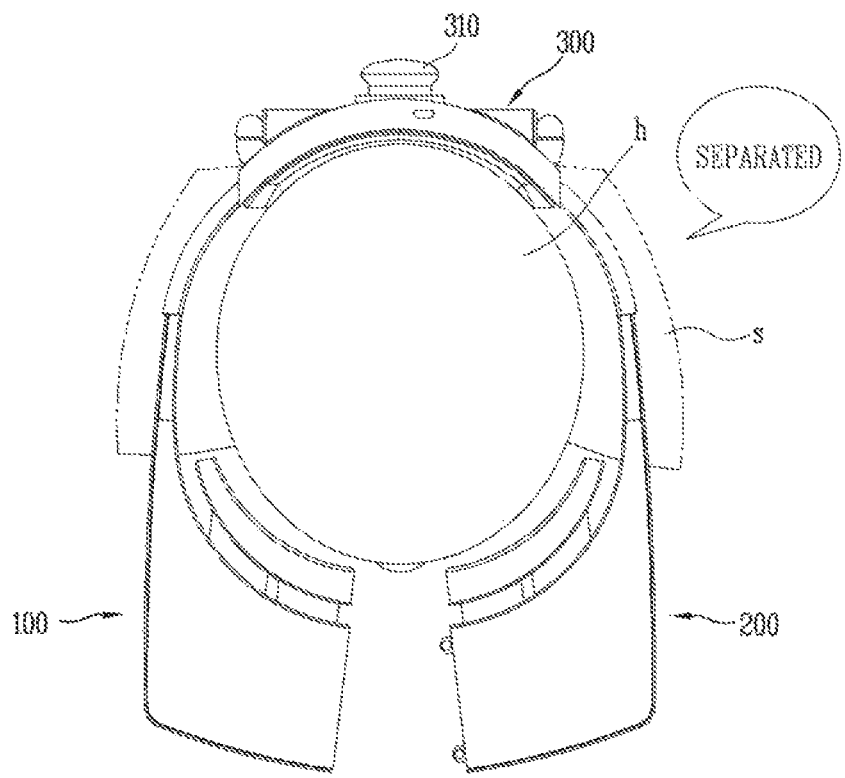

FIG. 2B illustrates a second state in which the first and second bodies 100 and 200 are separated. In the second state, the head-mounted display 1000 is worn on the user's head h. When the first and second bodies 100 and 200 are separated, the controller controls the first and second display portions 510 and 520 to stop image output. Also, the controller may control the audio output module 340 to output sound information indicating that the first and second bodies 100 and 200 are separated.

Since the first and second bodies 100 and 200 are separated from the third body 300 in a state in which the first and second bodies 100 and 200 are connected to the third body 300, a frame forming the first to third bodies 100, 200, and 300 may be formed of a deformable material. Although not illustrated in the drawings, when the first and second bodies 100 and 200 move over a reference range, the tightened state of the tightening portion 311 is released and the first and second bodies 100 and 200 may be switched to a loosened state.

For example, if the first and second bodies 100 and 200 are separated while the display unit 500 is playing a video file, the controller may perform control to pause the playback. Meanwhile, when the second state is switched to the first state, the controller may re-play the video file which was temporarily stopped.

Figure 2C:
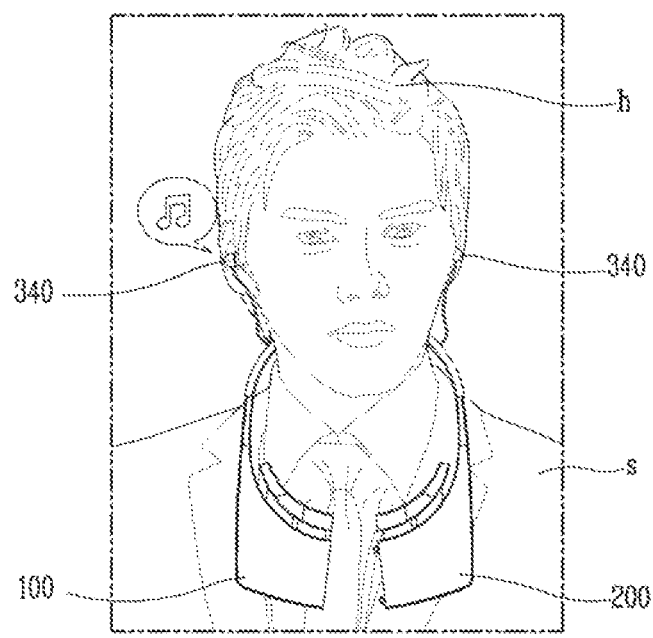

FIG. 2C illustrates a third state in which the head-mounted display 1000 is separated from the head h and put on the shoulder s in a state in which the first and second bodies 100 and 200 are separated. In the third state, the third support portion 330 of the third body 300 is hung on the user's neck. Due to the weight of the first and second bodies 100 and 200, the head-mounted display 1000 may be seated on the user's shoulders s and chest.

In this case, the controller may temporarily deactivate the display unit 1000. Further, the controller controls the display unit 500 not to output an image, or the like, although the first and second bodies 100 and 200 in the state in which the head-mounted display 1000 is hung on the shoulders s.

Meanwhile, the controller may control the audio output module 340 to output auditory information related to the image or sound information related to a state of the head-mounted display 1000. Accordingly, the user may continuously be provided with auditory information by the earphone-type audio output module 340 even in a state in which the user is not able to check the image.

The head-mounted display 1000 according to the present embodiment may further include a sensor portion for sensing movement of the first, second, and third bodies 100, 200, and 300. The sensor portion may include at least one of an acceleration sensor, a magnetic sensor, a G-sensor, a gyroscope sensor, a proximity sensor, and an illumination sensor.

The proximity sensor or the illuminance sensor may be disposed to be adjacent to the first to third support portions 110, 210, and 330 to recognize whether the head-mounted display 1000 is in contact with the user's body.

The controller may determine a use state of the head-mounted display 1000, such as whether the head-mounted display 1000 is mounted on a user's head or shoulders, on the basis of sensing information sensed by the sensor portion.

That is, when the user wants to temporarily stop watching an image from the head-mounted display 1000, the user may maintain the state in which the head-mounted display 1000 is hung on the shoulders s, and may return to the first state by coupling the first and second bodies 100 and 200.

Figure 2D:
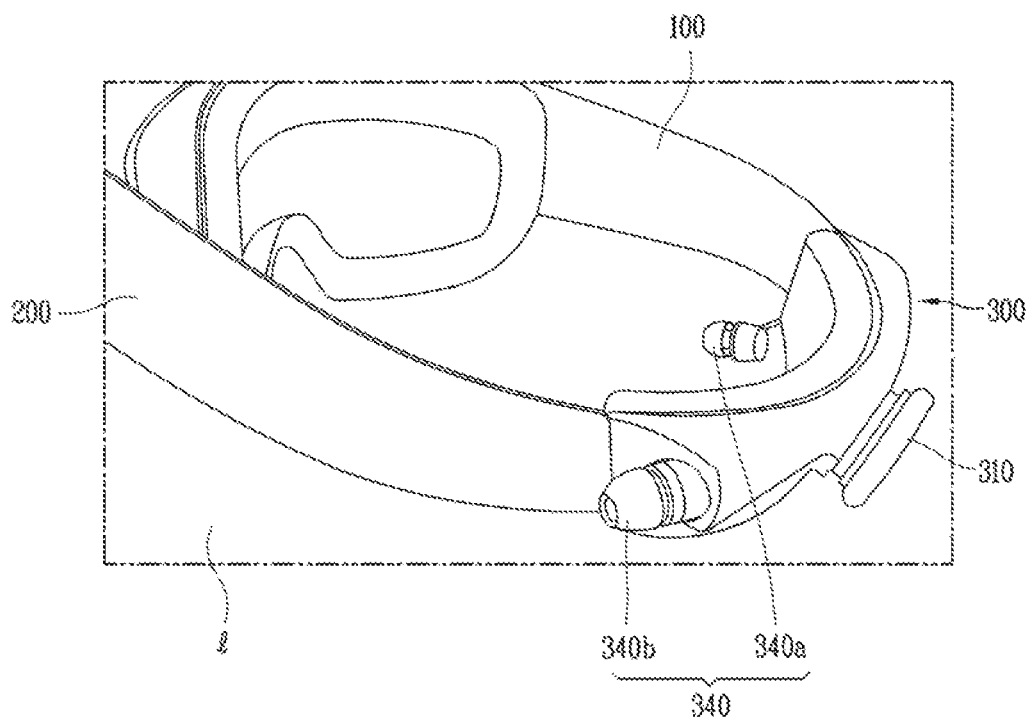

FIG. 2D is a conceptual diagram illustrating a fourth state in which the head-mounted display 1000 is separated from the user's body and placed on the ground. When it is determined that the head-mounted display 1000 is separated from the body, the controller deactivates the display unit 500 and the audio output module 340. That is, if it is determined by the sensor portion that the head-mounted display 1000 is supported on the ground even in a state in which the first and second bodies 100 and 200 are coupled, the controller may deactivate driving or turn off power.

According to the present embodiment, when the user temporarily separates the first and second bodies, the output of the display unit is stopped, and thus, the user may secure a visual field to the outside through a space between the first and second bodies 100 and 200.

Further, even when the user does not want to see visual information temporarily, the user may keep the head-mounted display 1000 on the shoulders, without having to separate it from the body, and in this state, the user may easily wear the head-mounted display on his head using the first and second bodies.

Since the controller controls the output of the visual information and the auditory information according to the first to fourth states, it is not necessary for the user to control the head-mounted display unit by applying a separate control command, and power consumption may be reduced by preventing output when the head-mounted display is not in use.

The first and second bodies 100 and 200 are separated by an external force. In the first state, the first and second bodies 100 and 200 are to be maintained in a coupled state so that the first and second display portions 510 and 520 are disposed in parallel. Hereinafter, a structure for fixing the first and second bodies 100 and 200 will be described in detail.

Figure 3A:
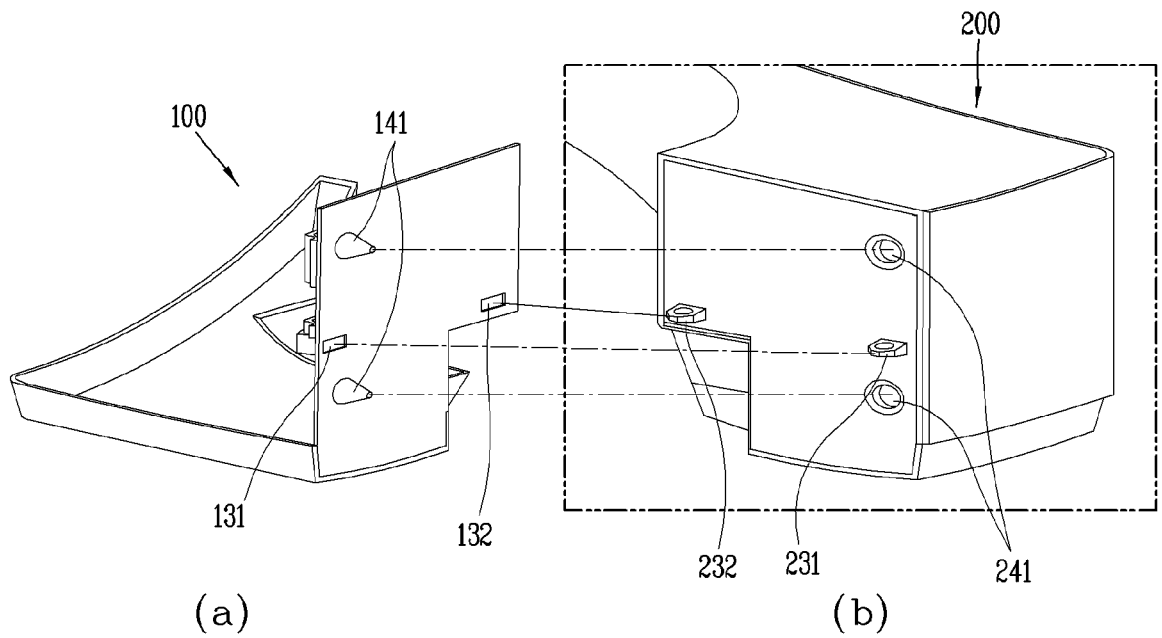
FIGS. 3A and 3B are conceptual views illustrating a coupling structure of first and second bodies according to an embodiment of the present invention.
Figure 3B:
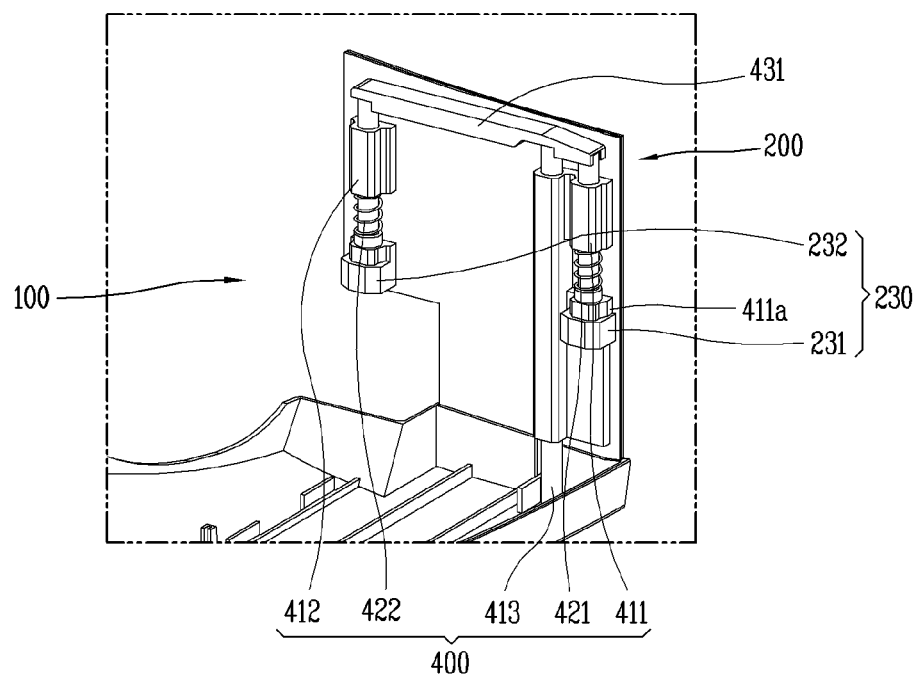

FIGS. 3A and 3B are conceptual diagrams illustrating a coupling structure of first and second bodies according to an embodiment of the present invention.

(a) of FIG. 3A illustrates a region of the first body 100, and (b) of FIG. 3A illustrates a region of the second body 200. The regions of the first and second bodies 100 and 200 corresponds to regions which are coupled in a facing manner.

First and second coupling holes 131 and 132 and guide protrusions 141 are formed at an end portion of the first body 100. A latch portion 230 including first and second latches 231 and 232 and guide recesses 241 are formed at an end portion of the second body 200 so as to correspond thereto. When the first and second bodies 100 and 200 are coupled in a facing state, the first and second latches 231 and 232 are inserted into the first and second coupling holes 131 and 132, respectively. The first and second latches 231 and 232 have insertion holes formed in a direction perpendicular to a direction in which the latches 231 and 232 protrude. End portions of the first and second latches 411 and 412 (See FIG. 3B) are fitted into the insertion holes. The guide protrusions 141 and the guide recesses 241 may be provided in plurality and may be arranged in a direction perpendicular to a direction in which the plurality of latches 231 and 232 are arranged.

The guide protrusions 141 are fitted into the guide recesses 241. The number and shape of the guide protrusions 141 and the guide recess 241 are not limited to those illustrated in the drawings. The first and second bodies 100 and 200 may be coupled without being distorted by the guide protrusions 141 and the guide recesses 241 and may be prevented from moving relative to each other in the coupled state.

End surfaces of the end portions of the first and second bodies 100 and 200 may have substantially the same shape. As illustrated, the end portions of the first and second bodies 100 and 200 may be flat or may have a concave or convex shape so as to be coupled to each other.

A pin portion 400 is disposed in an internal space of the first body 100. One end portions of the pin portions 412 and 413 are connected by a connection bar 431 so that they may move together in one direction.

The first and second pins 411 and 412 are formed to have substantially the same length and the third pin 413 is formed longer than the first and second pins 411 and 412. The third pin 413 may be disposed between the first and second pins 411 and 412.

Figure 3C:
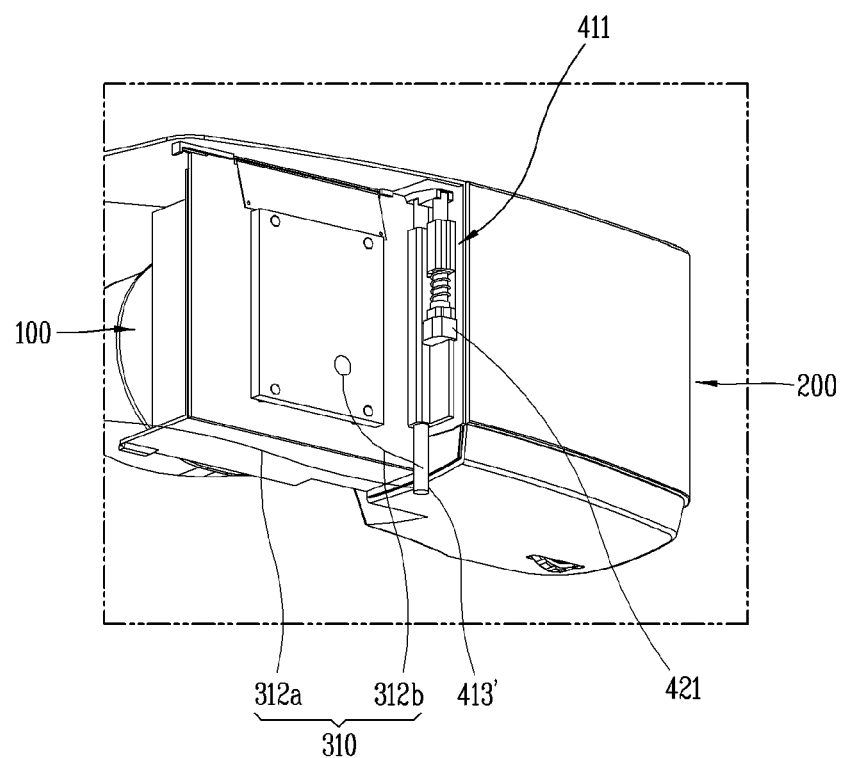
FIG. 3C is a conceptual view of FIG. 3A, viewed in a different direction.

FIG. 3C is a conceptual view of FIG. 3A, viewed from another direction.

Referring to FIG. 3C, one region of the third pin 413 protrudes outside the first body 100. The one region includes a pressing portion 413' for receiving an external force by a user. The first to third pins 411, 412, and 413 are moved by an external force applied to the pressing portion 413'.

The first and second pins 411 and 412 are separated from the first and second latches 231 and 232 by an external force applied by a user and are inserted into the recesses of the first and second latches 231 and 232 by a force of movement of the first and second bodies 100 and 200 and an elastic force of the first and second springs 421 and 422. When the first and second pins 411 and 412 are inserted (locked) into the first and second latches 231 and 232, the first state is implemented.

Hereinafter, a structure for connecting the first and second bodies by the pins and the latches will be described.

Figure 3D:
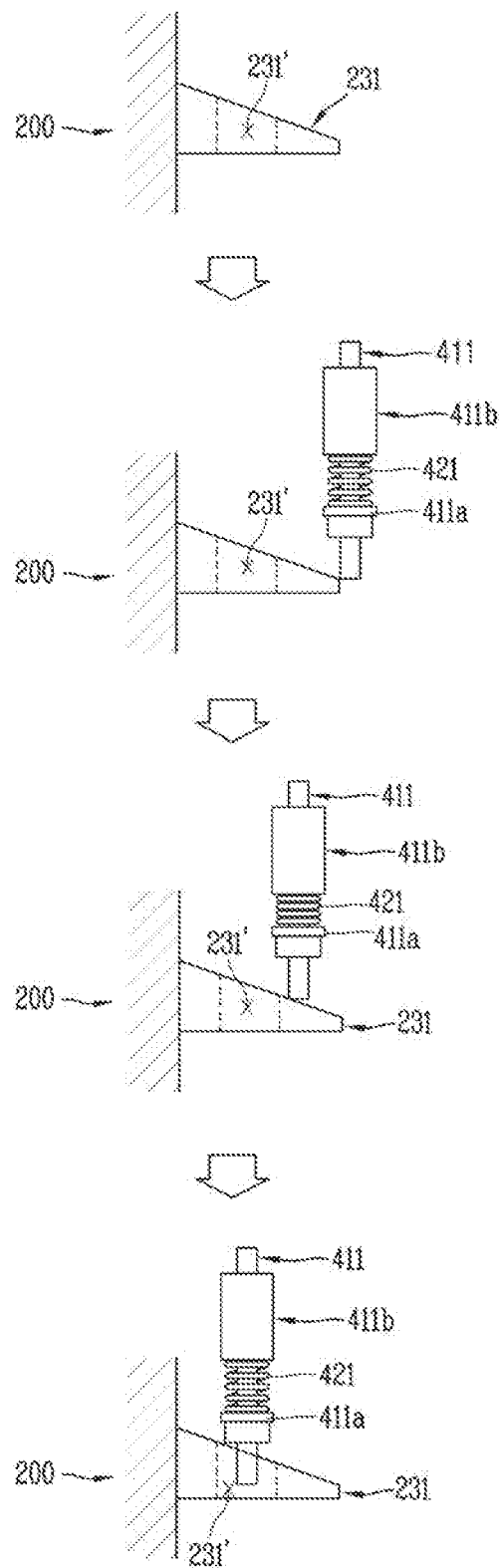
FIG. 3D is a conceptual view illustrating structural features of connecting a latch and a pin.

FIG. 3D is a conceptual diagram for explaining structural characteristics in which a latch and a pin are connected.

The first and second latches 231 and 232 are formed in a wedge shape having a thickness reduced toward an end portion thereof, and a recess 231' is formed at the center of the first and second latches 231 and 232 in a direction in which the first and second pins 411 and 412 extend. In the drawings, only the first latch 231 is illustrated, but the second latch 232 has the same shape as that of the first latch 231, and thus, a redundant description thereof will be omitted.

A supporting protrusion 411a and a moving protrusion 411b are formed on the first and second pins 411 and 412 and spaced apart from each other. The first spring 421 is inserted between the supporting protrusion 411a and the moving protrusion 411b. The second pin 412 also includes a moving protrusion, a supporting protrusion, and a spring, and has the same shape as that of the first pin 411, and thus, a redundant description thereof will be omitted.

When the first and second bodies 100 and 200 move toward each other, the first pin 411 moves along a slope from the thinnest portion of the first latch 231. The first spring 421 is compressed, while being moved along the slope of the first latch 231. The compressed first spring 421 is expanded by an elastic force when the end portion of the first pin 421 is inserted into the recess 231' of the first latch 231. The first pin 411 may be maintained in a state of being inserted in the recess 231' by virtue of the elastic force of the first spring 421.

In a state in which the first pin 411 is inserted into the recess 231', the first pin 411 is moved by an external force applied to the third pin 413 and separated from the recess 231'.

That is, the pin is fixed by a force based on which the first and second bodies 100 and 200 are moved to be close to each other, and may be maintained in the fixed state by the elastic force. Accordingly, the state in which the first and second bodies 100 and 200 are coupled may be more stably maintained. In addition, in case where the user wants to separate the first and second bodies, the user may apply an external force to a pressing portion formed on an outer surface of the body to easily separate the first and second bodies 100 and 200.

Figure 4:
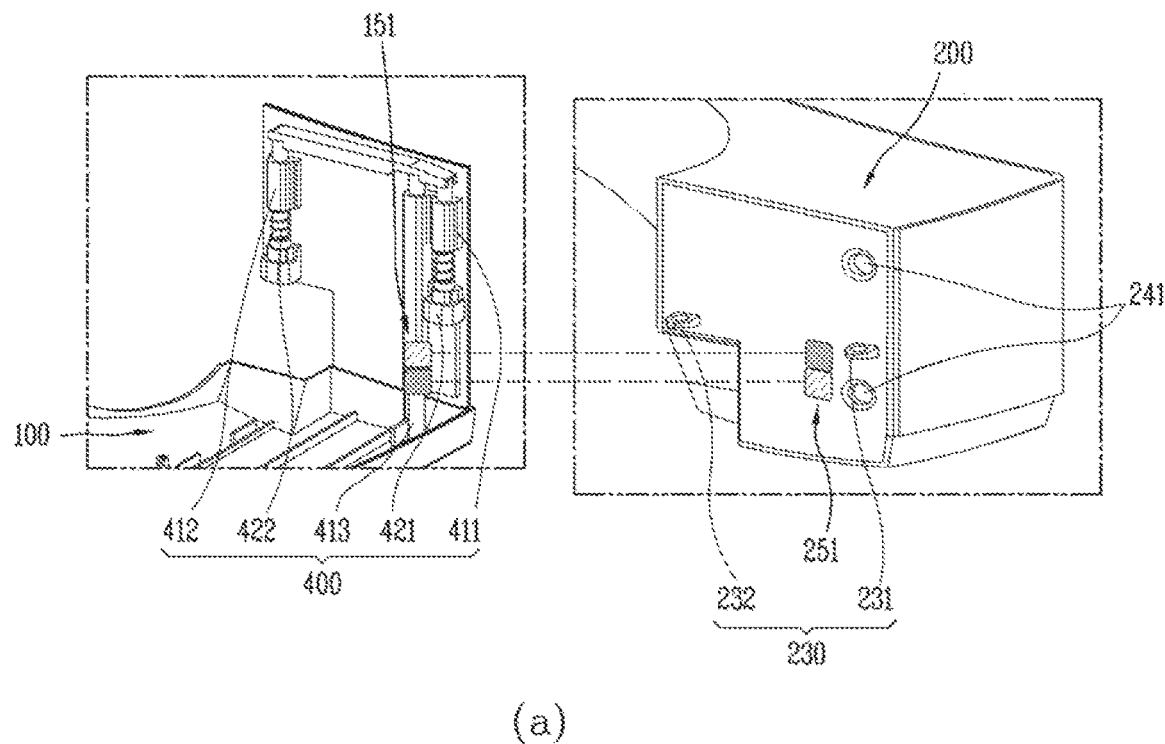
FIG. 4 is a conceptual view illustrating a magnet unit facilitating coupling and releasing of first and second bodies according to another exemplary embodiment of the present invention.
Figure 4:
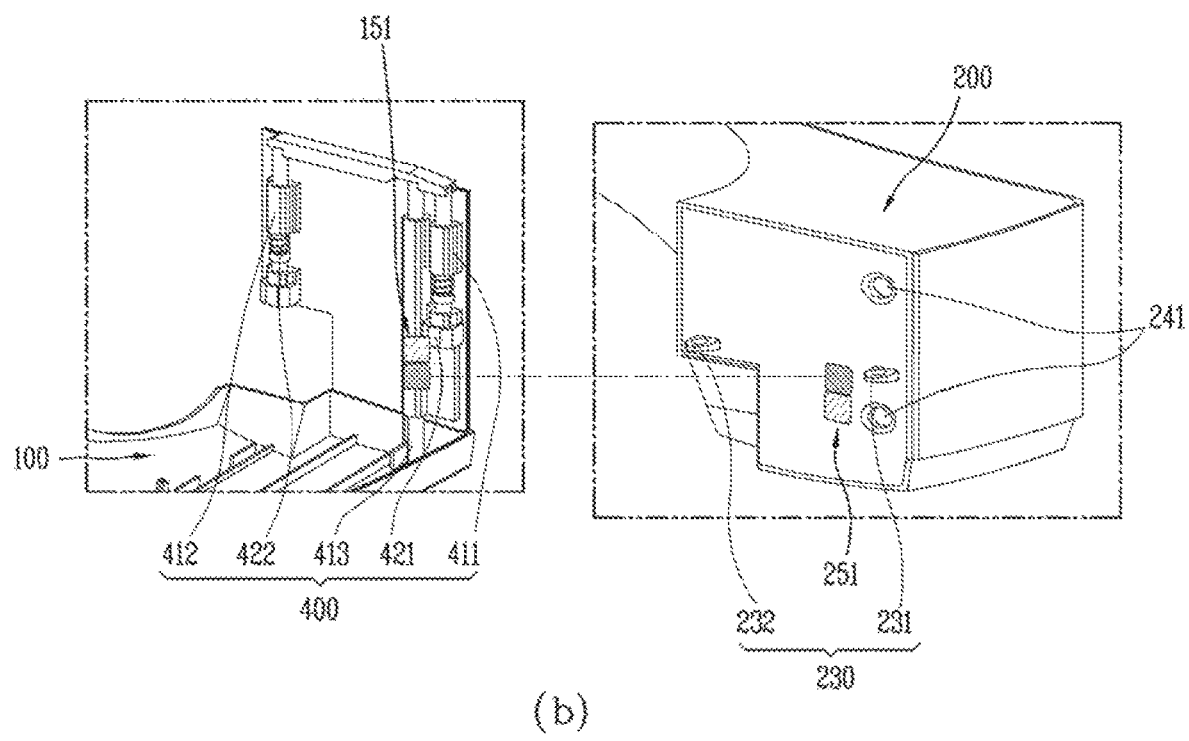

FIG. 4 is a conceptual diagram for explaining a magnet unit that facilitates coupling and release of first and second bodies according to another embodiment of the present invention.

A first magnet unit 151 is formed on the third pin 413. An N pole and an S pole of the first magnet unit 151 are disposed in parallel in a direction in which the first pin 413 extends. Also, a second magnet unit 251 is disposed on one surface of the second body 200. An N pole and an S pole of the second magnet unit 251 are also disposed in parallel in the direction in which the first pin 413 extends.

In a state in which the first and second bodies 100 and 200 are coupled and the first and second pins 411 and 412 are inserted into the first and second latches 421 and 422, the first and second magnet units 151 and 152 are disposed such that poles thereof oppose each other. Here, it is possible to prevent the first and second bodies 100 and 200 from being separated due to attraction of the opposite poles.

Meanwhile, when the third pin 413 is moved by an external force applied thereto, the first and second magnet units 151 and 251 are arranged such that the same poles face each other. Accordingly, a repulsive force is generated in a direction in which the first and second bodies 100 and 200 are moved away from each other. That is, when the user wants to separate the first and second bodies 100 and 200, the first and second bodies 100 and 200 may be separated more easily with the help of the repulsive force which moves the first and second bodies 100 and 200 away from each other.

According to the present embodiment, the first and second bodies may be coupled more firmly using an attraction and a repulsive force of the magnet units disposed on different bodies, and when the user wants to separate the first and second bodies, a force may be provided in a direction in which the first and second bodies are to be separated according to movement of the third pin.

Meanwhile, the user may easily release the head-mounted display from the worn-on state according to the structure of the first and second bodies 100 and 200 which may be separate from each other. Also, the head-mounted display 1000 according to an embodiment includes a tightening portion so that the head-mounted display may be stably worn on the head. Hereinafter, a structure of the tightening unit will be described.

Figure 5A:
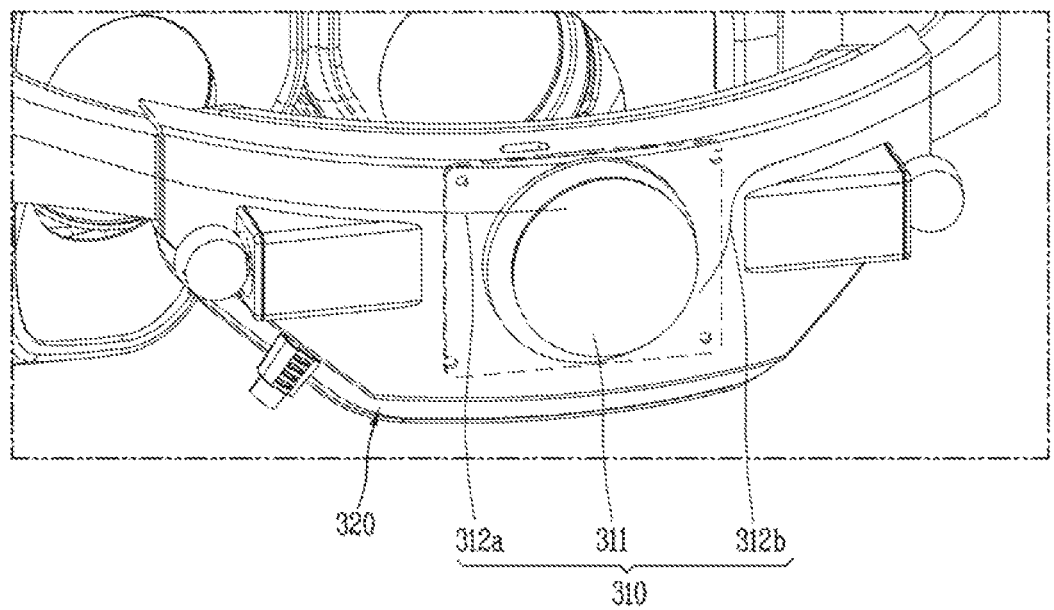
FIG. 5A is a conceptual view illustrating a structure of a tightening unit disposed on a rear side according to an embodiment.
Figure 5B:
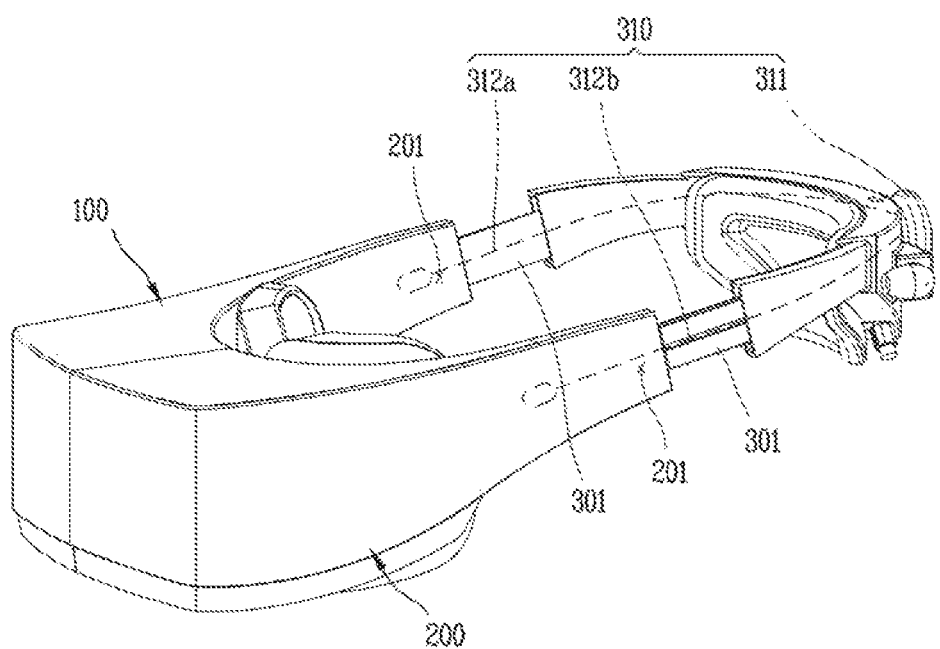
FIG. 5B is a conceptual view illustrating a structure of a tightening rail.

FIG. 5A illustrates a structure of a tightening unit disposed on the rear according to an embodiment and FIG. 5B is a conceptual diagram illustrating a structure of a tightening rail.

Referring to FIG. 5A, a tightening unit 310 includes the tightening portion 311 and a wire. The wire includes first and second regions 312a and 312b extend in directions opposite to each other with respect to the tightening portion 311. The tightening portion 311 may be disposed at the center of the third body 300 but is not limited thereto.

The first region 312a extends from the tightening portion 311 to the first body 100. An end portion of the first region 312a is fixed to one region of the first body 100. The second region 312b extends from the tightening portion 311 to the second body 200 and is fixed to one region of the second body 200. The wire reaches the first and second bodies 100 and 200 through the inside of the third body 300.

The tightening unit 310 includes a boa system in which a wire is tightened or loosened by an external force. For example, when the tightening portion 311 is rotated in a specific direction, the wire is wound and the first and second bodies 100 and 200 are more closely attached to the head by a tension of the wire.

Referring to FIG. 5B, the third body 300 includes a pair of tightening rails 301 formed at both ends connected to the first and second bodies 100 and 200. The tightening rail 301 is formed such that at least one region thereof is insertable into the first and second bodies 100 and 200. That is, the first and second bodies 100 and 200 have an insertion space allowing the tightening rail 301 to be inserted therein. When the tension of the wire is applied to the first to third bodies 100, 200 and 300 by the tightening portion 311, the tightening rail 301 is gradually inserted into the insertion spaces of the first and second bodies 100, and accordingly, the space formed by the first to third bodies 100, 200, and 300 is reduced.

Since the first and second bodies 100 and 200 are elastically moved by the tension, the user may feel pressure on the head and wear the head-mounted display 1000 stably.

Meanwhile, when the tightening portion 311 is pressed or pulled, the wire wound around the tightening portion 311 is unwound and the tension is released. That is, the user may wear the head-mounted display more stably by adjusting the tightening portion 311.

Figure 6:
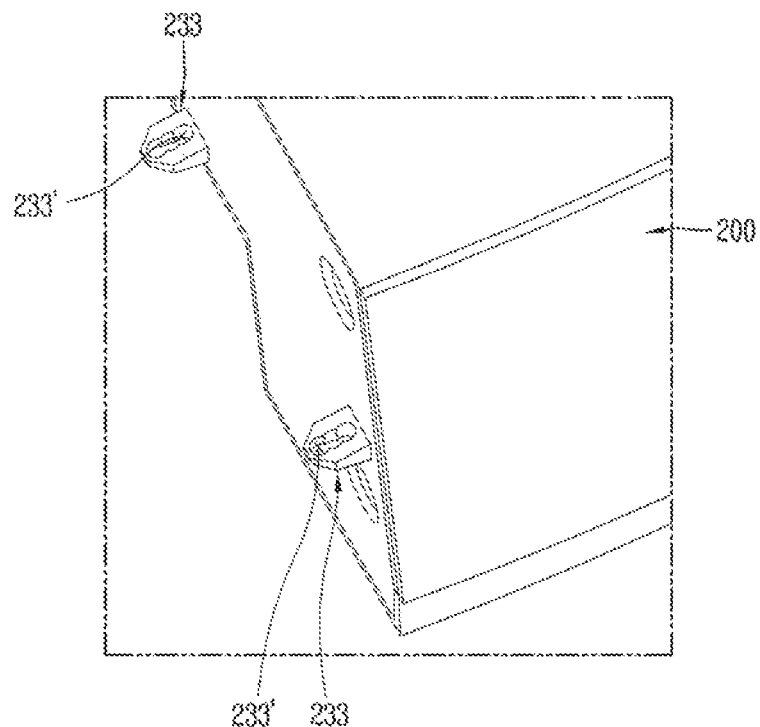
FIG. 6 is a conceptual view illustrating an adjustment latch for adjusting a distance between first and second bodies.

FIG. 6 is a conceptual diagram illustrating an adjustment latch for adjusting a distance between the first and second bodies.

Referring to FIG. 6, the adjustment latch 233 includes a wedge shape of the first and second latches 231 and 232 and has a plurality of holes 233' continuous with each other. The plurality of holes 233' are connected to each other, and one hole forms a circular structure in which the pin may be mounted. When an external force is applied in a state in which the pin is inserted into one hole, the pin may be fitted into another adjacent hole.

A distance between the first and second bodies 100 and 200 may be changed by inserting the pin into any one of the plurality of holes. When the pin is inserted into a hole closest to the second body 200, the first body 100 and the second body 200 are coupled to each other in a state of being in a close contact state.

According to the present exemplary embodiment, a distance between the user's both eyes and the first and second display portions 510 and 520 may be adjusted by adjusting the distance between the first and second bodies 100 and 200 on which the first and second display portions 510 and 520 are respectively mounted.

Figure 7:
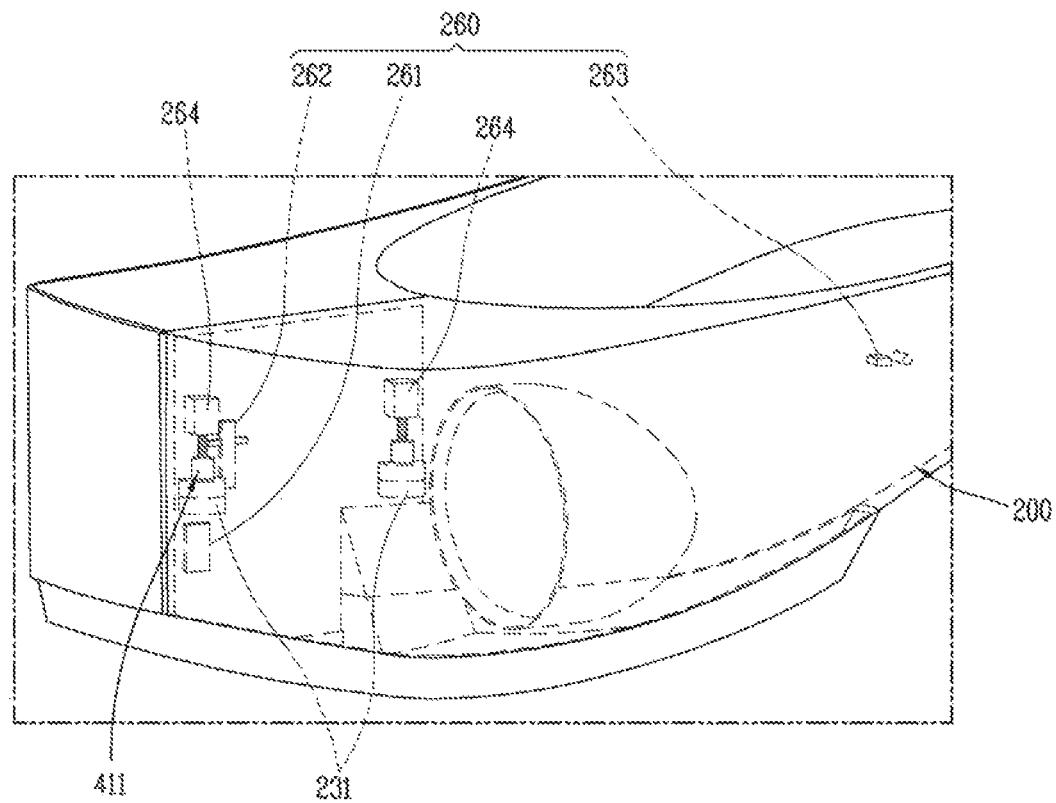
FIG. 7 is a conceptual view illustrating a structure in which a tightening module and a fixing module interwork with each other according to an embodiment.

FIG. 7 is a conceptual diagram illustrating a structure in which a tightening module and a fixing module interwork with each other according to an embodiment.

The fixing module includes the pin portion 400 and the latch portion 230. The fixing module interworks with the tightening module by a switch module 260 and a motor portion 264. When the switch module 260 senses movement of the first and second bodies 100 and 200 and an application of a tension by the tightening module 310, the switch module 260 drives the motor portion 264 to move the pin.

The switch module 260 includes first to third switches 261, 262 and 263. The first switch 261, which is a magnetic switch, detects that the first and second bodies 100 and 200 are coupled to each other. When the first switch 261 detects that the first and second bodies 100 and 200 are coupled, the controller drives the motor portion 264. The motor portion 264 moves one region of the first pin 411.

The second switch 262 is formed to be engaged with one region of the first pin 411. The second switch 262 is driven by movement of the first pin 411. The second switch 262, which is a limit switch, is driven to cut off power of the motor portion 264. When power of the motor portion 264 is cut off, it is locked.

Meanwhile, the second switch 262 is connected to a third switch 263 for sensing driving of the tightening unit 310. The third switch 263 may be implemented as a spring switch. The third switch is connected to the wire of the tightening unit 310 to sense an applied tension. When a tightening state of the tightening unit 310 is released, the tension is released and the third switch 263 senses that.

When the spring switch, which is the third switch 263, is released, the motor portion 264 rotates in the opposite direction. The motor portion 264 rotates until the limit switch is driven. The pin is separated from the latch according to the rotation of the motor portion 264.

According to the present embodiment, the fixing module may be moved according to movement of the first and second bodies and driving of the tightening unit. Thus, it is possible to prevent the first and second bodies from being disconnected due to unintentional pressing, and it is possible to easily separate the first and second bodies by driving the motor portion without having to apply an external force by the user.

Figure 8A:
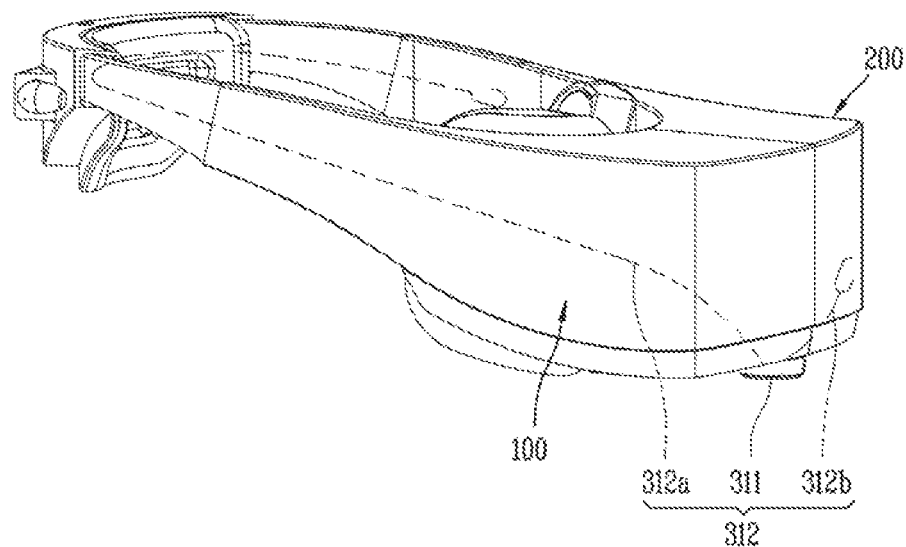
FIGS. 8A to 8C are conceptual views illustrating a structure in which a tightening module is disposed at a first body according to an embodiment of the present invention.
Figure 8B:
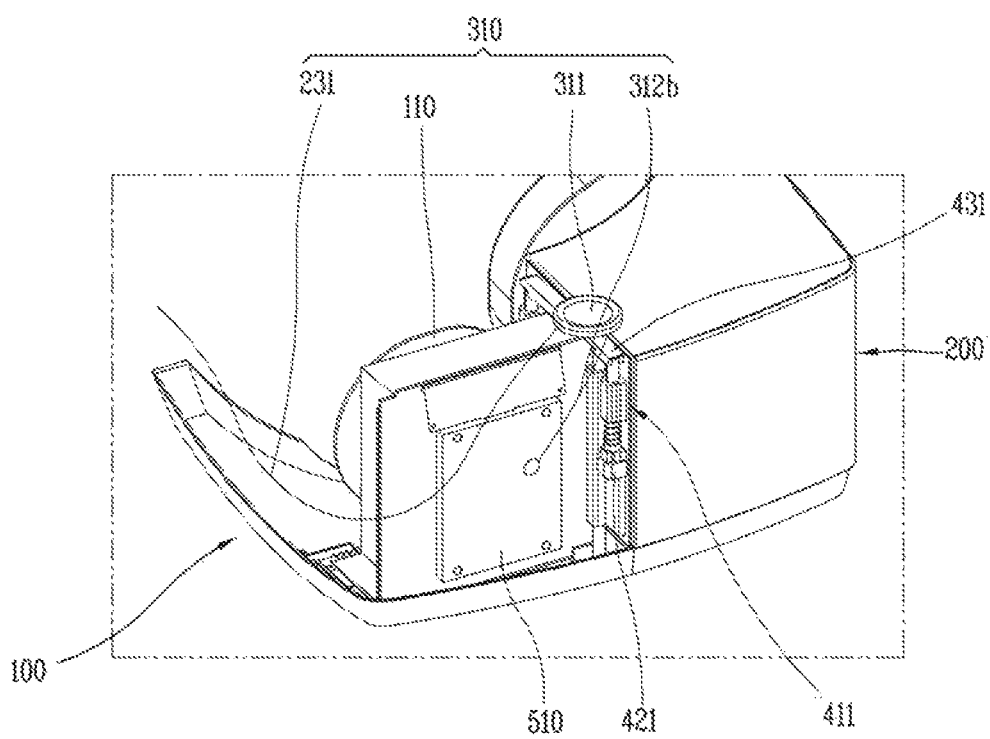
Figure 8C:
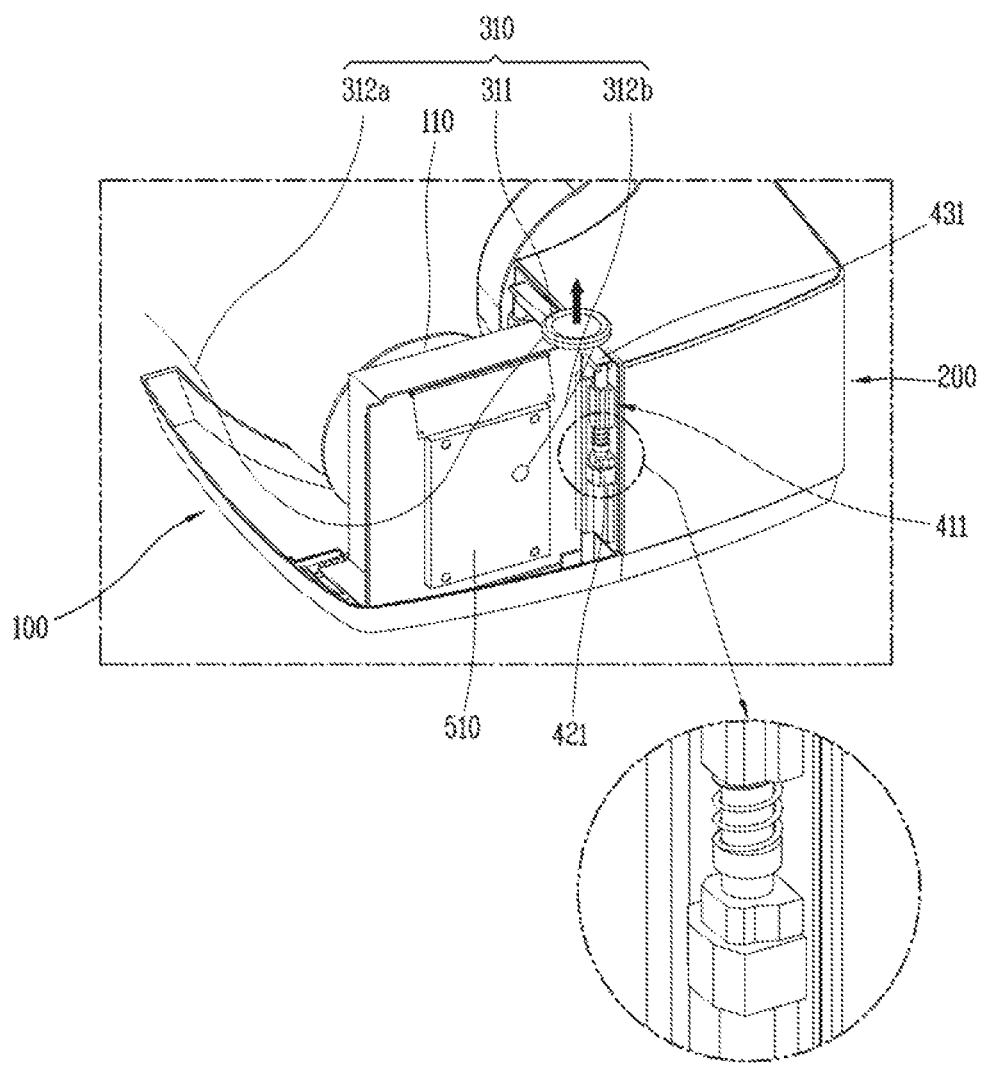

FIGS. 8A to 8C are conceptual diagrams illustrating a structure in which a tightening module is disposed in the first body according to an embodiment of the present invention.

Referring to FIGS. 3A, 8A, and 8B, the tightening portion 311 of the tightening module 310 is connected to the connection bar 431 and the first to third pins 411, 412, and 413 are moved according to movement of the tightening portion 311.

The first and second regions 312a and 312b of the wire extending from the connection bar 431 are connected to one regions of the first and second bodies 100 and 200, respectively. The first region 312a is fixed to the first body 100. The second region 312b longer than the first region 312a is fixed to one region of the second body 200 through the first and third bodies 100 and 300. Thus, when a tension is applied to the wire, the first and second bodies 100 and 200 move along a guide region so as to be close to the center of the third body 300.

Referring to FIGS. 8B and 8C, when the tightening portion 311 is pulled, the tension of the wire is released and the first and second pins 411 and 412 move. The first and second pins 411 and 412 are separated from the latch as the first to third bodies 100, 200 and 300 are loosened. Accordingly, the first and second bodies 100 and 200 may be separated.

According to the present embodiment, the first and second bodies 100 and 200 may be separated at the same time, while the tightening portion 311 is moved to release tightening.

Figure 9A:
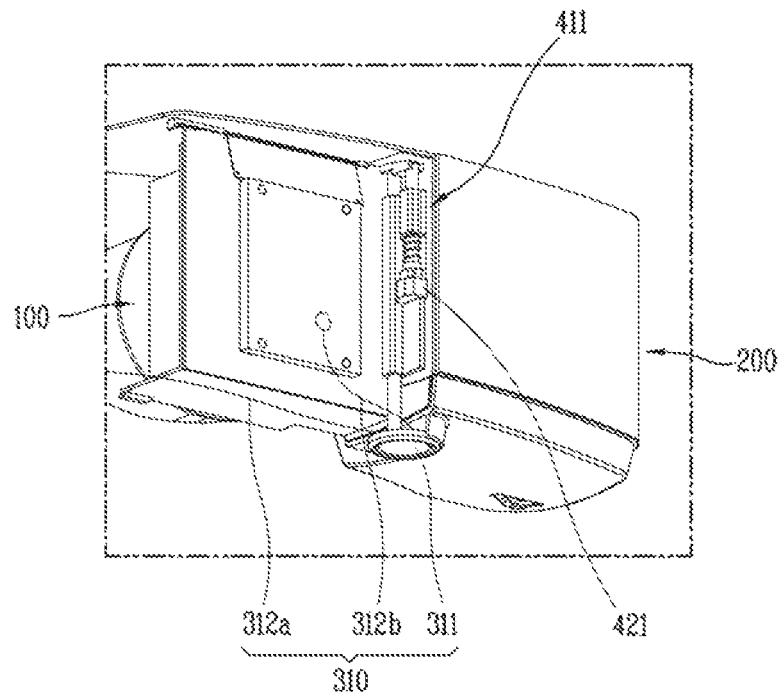
FIGS. 9A and 9B are conceptual views illustrating a structure in which a tightening portion is fixed to an end portion of a third pin according to another embodiment.
Figure 9B:
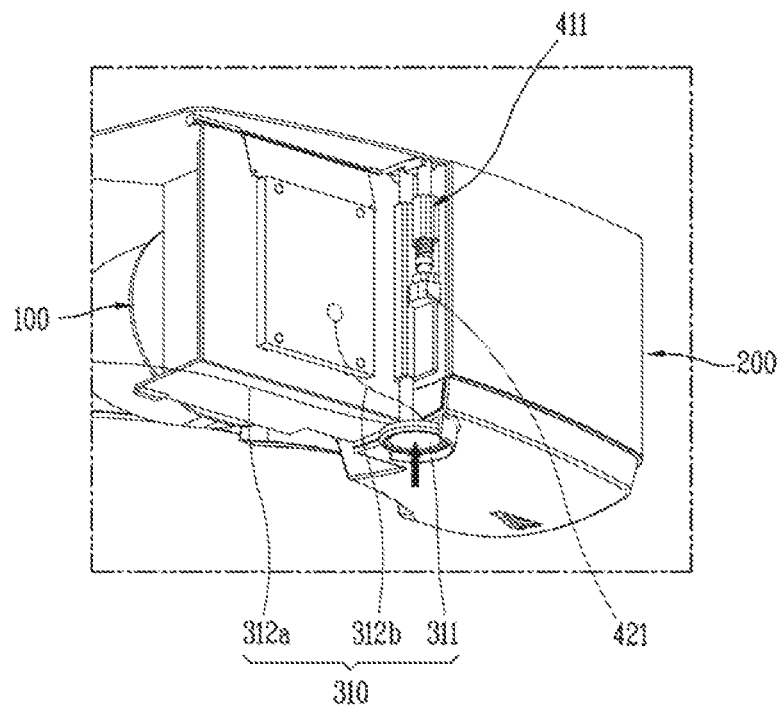

FIGS. 9A and 9B are conceptual diagrams illustrating a structure in which a tightening portion is fixed to an end portion of a third pin according to another embodiment.

The tightening portion 311 is fixed to an end portion of the third pin 413. The first region 312a of the wire connected to the tightening portion 311 is fixed to the first body 100 and the second region 312b is fixed to one region of the second body through the first and third bodies 100 and 300.

When the tightening portion 311 is pressed, the tension of the wire is released. At the same time, the first and second pins 411 and 412 are moved to be separated from the latches on the basis of a physical movement of the tightening portion 311.

Accordingly, since the tension applied to the first and second bodies is released and the first and second bodies are separated according to the operation of the tightening portion 311, the user may easily release wearing of the head-mounted display through a single operation.

Figure 10A:
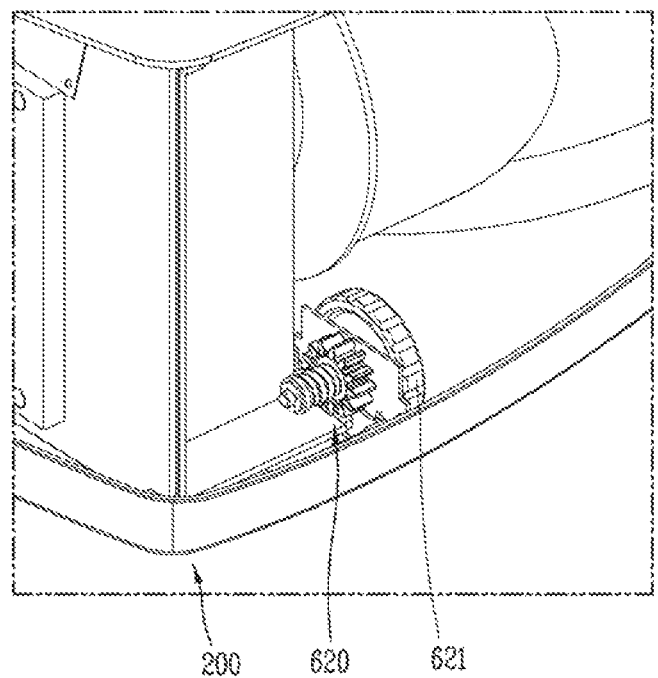
FIGS. 10A to 10C are conceptual views illustrating a structure in which first and second display portions are moved according to another embodiment of the present invention.
Figure 10B:
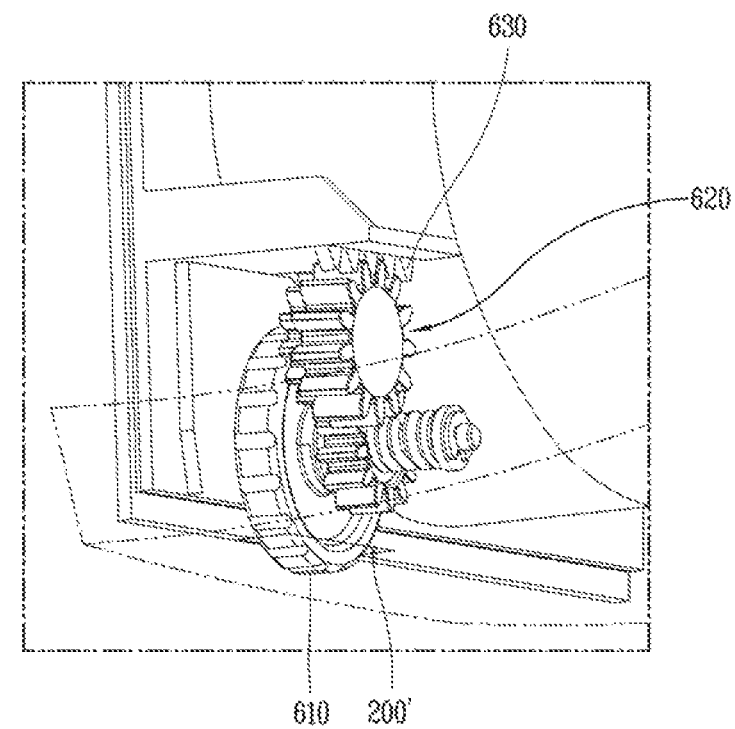
Figure 10C:
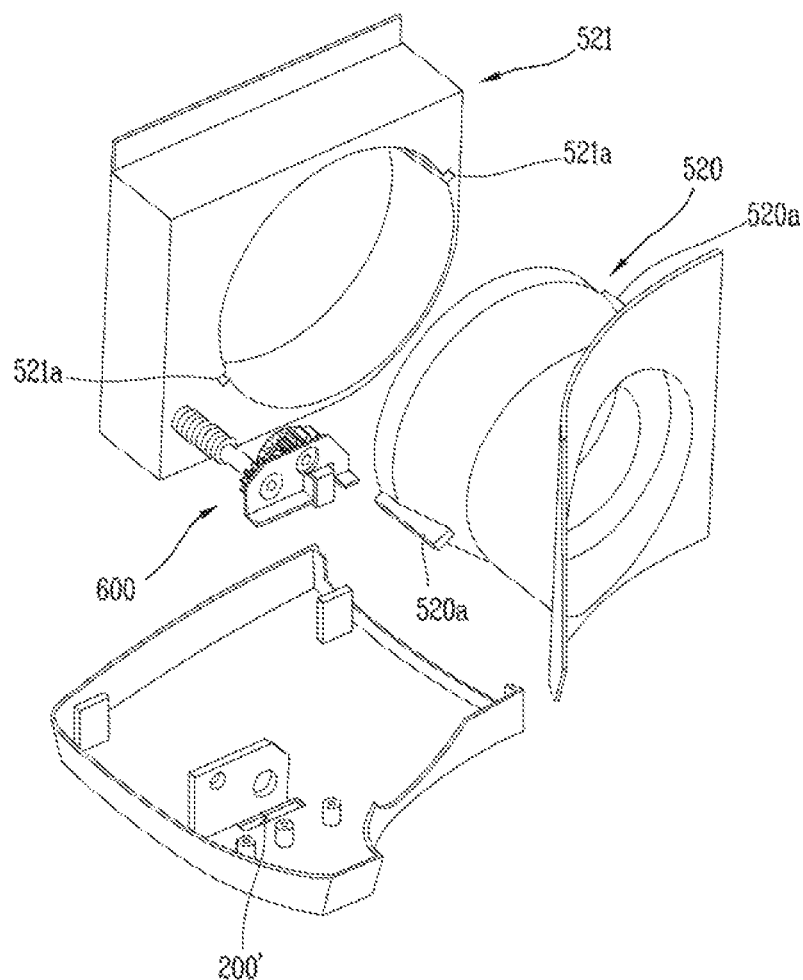

FIGS. 10A to 10C are conceptual diagrams illustrating a structure for moving the first and second display portions according to an embodiment of the present invention.

Referring to FIG. 10A, each of the first and second bodies 100 and 200 includes a moving module configured to move the first and second display portions 510 and 520, respectively.

The moving module includes a handle portion 621 and a gear portion 620. A portion of the handle portion 621 is exposed to the outside through a hole formed at the second body 200. When the handle portion 621 is rotated by an external force applied to a portion of the handle portion 621 exposed through the hole, the gear portion 620 rotates. The gear portion 620 is formed of at least one gear. A shaft of the gear is fixed to the second display portion 520.

The gear 620 may be engaged with a rack formed at one region of the first and second bodies 100 and 200 to move the second display portion 520.

Referring to FIG. 10B, the moving module includes a handle portion 610 exposed to one region by a hole 200' of the second body 200, the gear portion, and a rack part 630 fixed to the second display portion 520. At least one gear and pinion included in the gear portion 620 are rotated according to rotation of the handle portion 610 to move the second display portion 520.

Referring to FIG. 10C, the second display portion 520 includes a lens cover 520 and an optical module 521. One region of the lens cover 520 is received to one region of the optical module 521 so that the optical module 521 and the lens cover 520 are assembled. The lens cover 520 includes a guide rib 520a protruding from an outer circumferential surface of the lens cover 520, and the optical module 521 includes a guide rail 521a depressed on an inner circumferential surface forming one region to which the lens cover 520 is received. The guide ribs 520a and the guide rails 521a extend in a direction in which the lens cover 520 is assembled to the optical module 521.

Accordingly, the optical module 521 and the lens cover 520 are stably assembled, and although the moving module 600 is fixed to at least one of the optical module 521 and the lens cover 520, the optical module 521 and the lens cover 520 may be stably moved together.

Accordingly, even in the structure in which the first and second bodies 100 and 200 are separated and coupled, the user may adjust the distance between the first and second display portions 510 and 520 according to a distance between the eyes of the user.

The first display portion 510 and the first body 100 include the moving module as described above and include substantially the same components, and thus, a redundant description thereof will be omitted.

Figure 11:
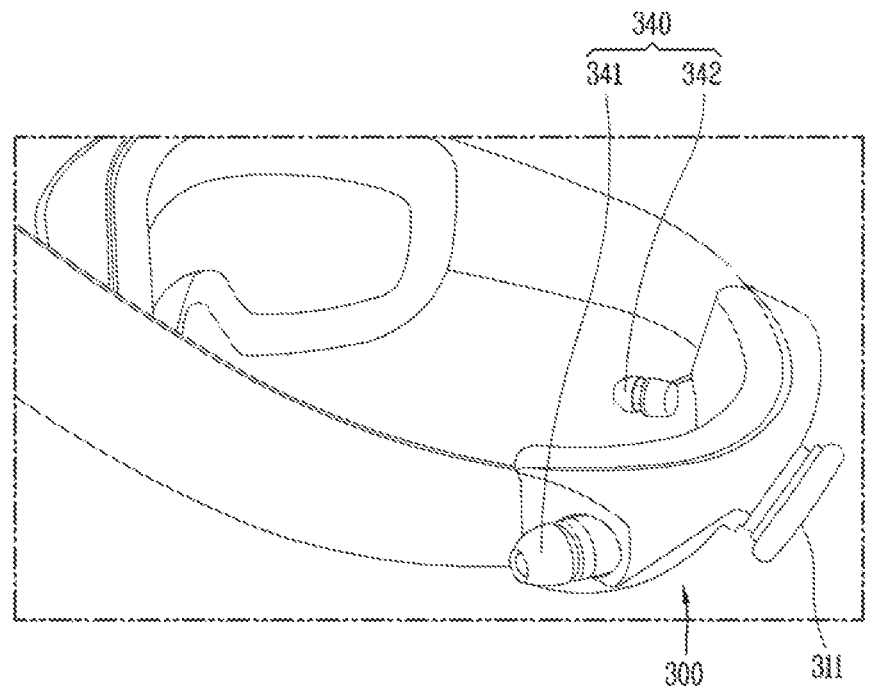
FIG. 11 is a conceptual view illustrating an audio output module according to an exemplary embodiment.
Figure 11:
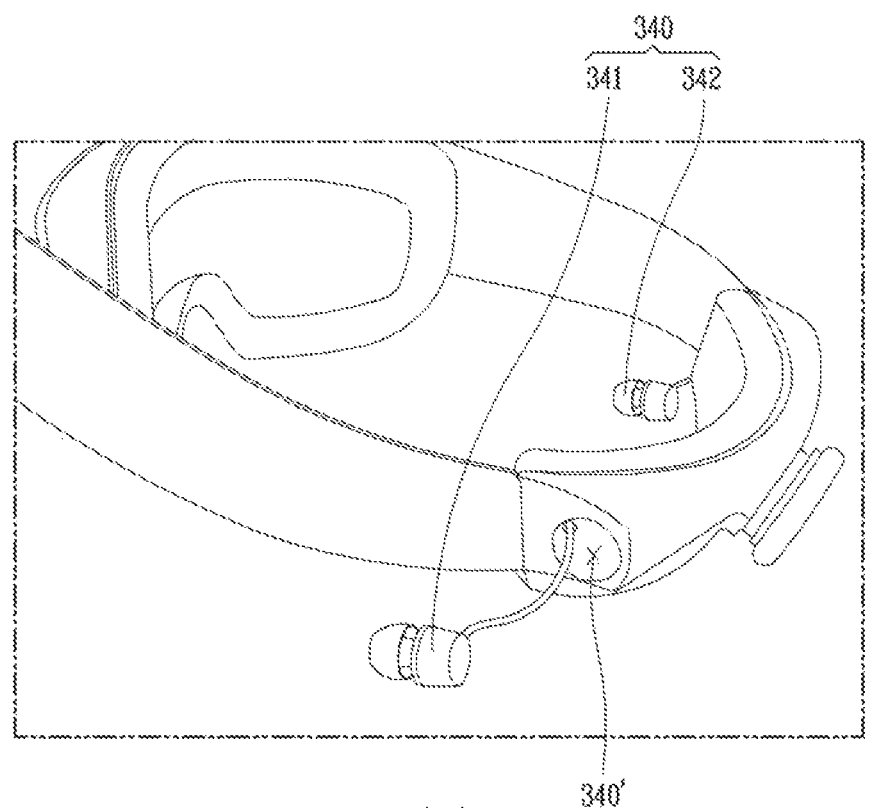

FIG. 11 is a conceptual diagram for explaining an audio output unit according to an embodiment.

Referring to (a) and (b) of FIG. 11, a receiving recess 340' for receiving first and second earphones 341 and 342 of the audio output module 340 is formed at the third body 300. The first and second earphones 341 and 342 are electrically connected to the inside of the third body 300 by an electric wire, or the like.

Accordingly, when the user wants to use the audio output unit 340, the user may take out the first and second earphones 341 and 342 from the receiving recess 340' and put the same on the ear.

Figure 12:
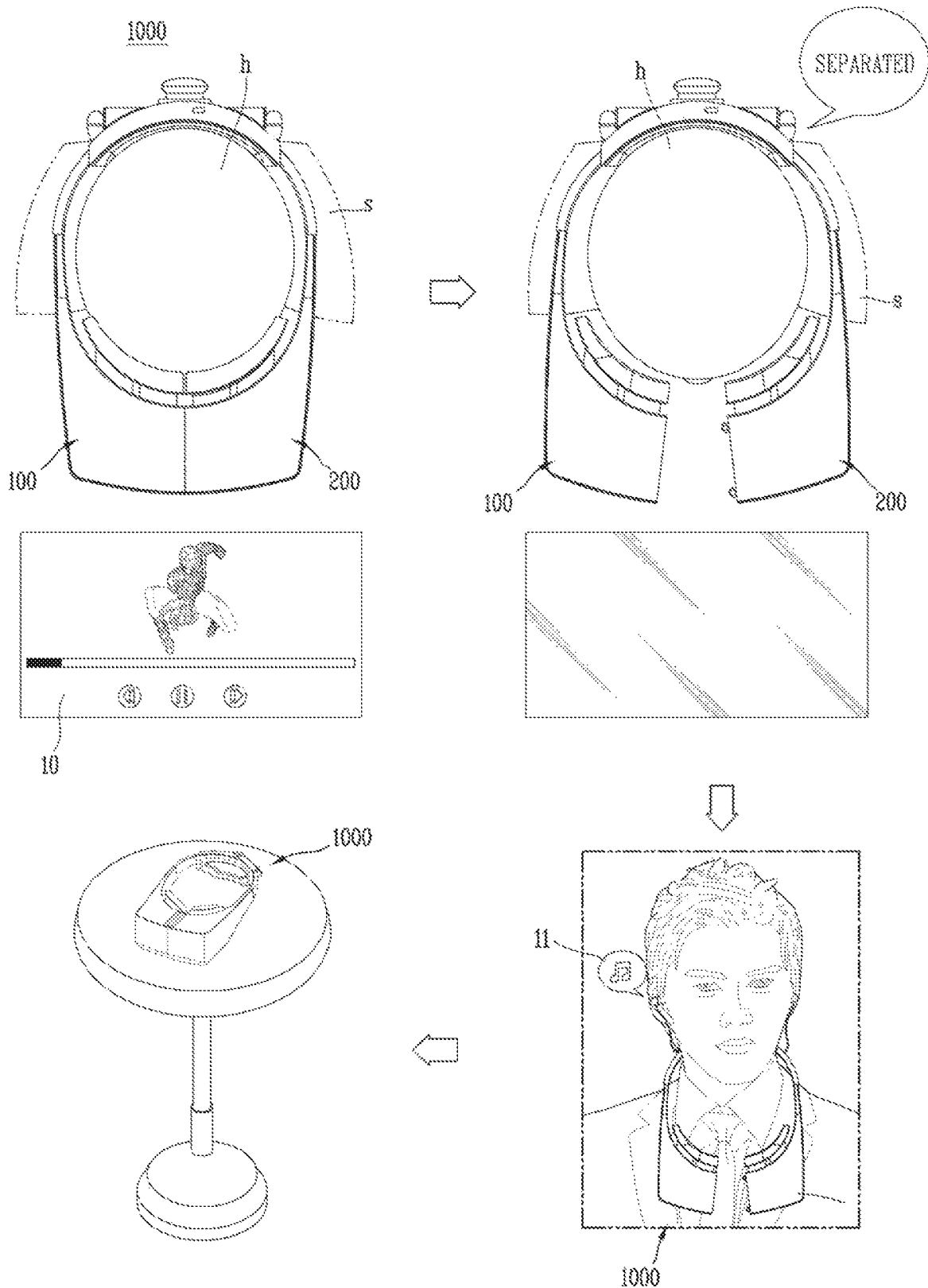
FIG. 12 is a conceptual view illustrating a control method of outputting information according to an embodiment of the present invention.

FIG. 12 is a conceptual diagram for explaining a control method of outputting information according to an embodiment of the present invention.

Referring to FIG. 12, when the head-mounted display 1000 is worn on the user's head h in a state in which the first and second bodies 100 and 200 are coupled, the controller of the head-mounted display 1000 controls the first and second display portions 510 and 520 to output an image 10. The first and second display portions 510 and 520 output one image.

When the first and second bodies 100 and 200 are separated from each other in a state of being worn on the head h, the controller controls the first and second display portions 510 and 520 to turn off the screen. In this case, the controller may output a voice notification that the first and second bodies 100 and 200 are separated.

When it is sensed by the sensor portion which detects movement of the head-mounted display 100 that the head-mounted display 1000 is put on the user's shoulders, the controller may control the first and second display portions 510 and 520 to stop outputting an image and output only auditory information corresponding to the image.

In addition, when it is determined that the head-mounted display 1000 is separated from the user's body and placed on a specific ground, the controller may perform control to limit all the outputs and switch to an inactive state.

According to the present embodiment, since the head-mounted display 1000 automatically controls output of data according to a use state, when the user wants to temporarily stop the use, a function may be temporarily stopped without a separate control command, and when the head-mounted display is not used, it may be automatically switched to an inactive state, reducing power consumption.

The detailed description should not be interpreted as being limited from all aspects, but should be considered as being illustrative. The scope of the present invention should be determined by reasonable analysis of the attached claims, and all changes within an equivalent range of the present invention fall within the scope of the present invention.

INDUSTRIAL APPLICABILITY

The present invention provides the head-mounted display that is easily detachable because the first and second bodies equipped with the display portions corresponding to both eyes are separable. Therefore, it may be utilized in various industrial fields related thereto.

The invention claimed is:

1. A head-mounted display comprising:
first and second bodies respectively having first and second display portions and configured to be wearable on a user's head;
a third body connecting one end portions of the first and second bodies; and
a fixing module formed at each of another end portions of the first and second bodies and allowing the other end portions of the first and second bodies to be coupled to each other or to be separated from each other,
wherein the fixing module includes:
a latch portion protruding from the second body; and
a pin portion installed at the first body,
wherein the latch portion includes first and second latches disposed to be spaced apart from each other, the first latch having a first insertion hole and the second latch having a second insertion hole,
wherein the pin portion includes:
a first pin having one end portion inserted into the first insertion hole of the first latch penetrating through the other end portion of the first body;
a second pin having one end portion inserted into the second insertion hole of the second latch penetrating through the other end portion of the first body;
a connection bar connecting the first and second pins;
a third pin extending from the connection bar in a direction in which the first and second pins extend and having one end portion protruding to outside of the first body; and
a pressing portion formed at the one end portion of the third pin protruding to the outside the first body, and
wherein the first to third pins are moved by an external force applied to the pressing portion, and the first and second pins are separated from the first and second latches by the external force.

2. The head-mounted display of claim 1, wherein
the first and second latches have a wedge shape reduced in thickness in a direction away from the second body, and
the first and second pins further include a spring providing an elastic force in a direction in which the first and second pins extend.

3. The head-mounted display of claim 1, wherein
the third pin moves in a direction in which the third pin extends by the external force applied to the pressing portion,
the third pin includes a first magnet unit having an N pole and an S pole disposed according to the extending direction, and
the second body includes a second magnet unit disposed at one region corresponding to the first magnet to generate an attraction or a repulsive force together with the first magnet unit according to movement of the third pin in a state in which the first and second bodies are coupled.

4. The head-mounted display of claim 1, further comprising:
a tightening unit mounted at one region of the first to third bodies and reducing and expanding a space formed by the first to third bodies in a state in which the first and second bodies are coupled,
wherein the tightening unit includes:
a wire having both ends fixed to the first and second bodies; and
a tightening portion connected to the wire and providing a tension to the wire according to rotation.

5. The head-mounted display of claim 4, wherein the tightening portion is connected to the end portion of the third pin or the connection bar.

6. The head-mounted display of claim 4, wherein the tightening portion is disposed at the third body,
a switch module and a motor portion driven by the tightening unit are provided, and
the first and second pins move with respect to the insertion hole on the basis of rotation of the motor portion.

7. The head-mounted display of claim 6, wherein the switch module includes:
a first switch sensing coupling and separation of the first and second bodies;
a second switch sensing movement of the first and second pins to control driving of the motor portion; and
a third switch disposed at one region of the first and second bodies in which the wire is mounted, to sense a tension of the wire.

8. The head-mounted display of claim 1, further comprising:
a moving module mounted at one region of the first and second display portions and the first and second bodies and moving the first and second display portions in a direction away from each other or toward each other,
wherein the moving module includes:
a handle portion exposed to the outside of the first and second bodies;
a gear portion interworking with rotation of the handle portion; and
a rack disposed at the first and second display portions or the first and second bodies and engaged with the gear portion.

9. The head-mounted display of claim 1, further comprising:

a sensor portion sensing a coupled state of the first and second bodies, a separated state of the first and second bodies, and a state of the first and second bodies worn on the user's head; and a controller controlling the first and second display portions on the basis of a state sensed by the sensor portion.

10. The head-mounted display of claim 1, wherein:

the one end portion of the first pin is insertable into the first insertion hole only when the first latch penetrates through the other end portion of the first body; and the one end portion of the second pin is insertable into the second insertion hole only when the second latch penetrates through the other end portion of the first body.

11. The head-mounted display of claim 1, wherein:

the first insertion hole is located at an inner side of the first body when the first latch penetrates through the other end portion of the first body; and the second insertion hole is located at the inner side of the first body when the second latch penetrates through the other end portion of the first body.

12. The head-mounted display of claim 11, wherein an outer surface of the first body and an outer surface of the second body are in contact with each other when the first latch and the second latch penetrate through the other end portion of the first body.

\* \* \* \* \*